US011740941B2

(12) United States Patent
Abraham et al.

(10) Patent No.: US 11,740,941 B2
(45) Date of Patent: Aug. 29, 2023

(54) METHOD OF ACCELERATING EXECUTION OF MACHINE LEARNING BASED APPLICATION TASKS IN A COMPUTING DEVICE

(71) Applicant: Samsung Electronics Co., Ltd., Gyeonggi-do (KR)

(72) Inventors: Arun Abraham, Bangalore (IN); Suhas Parlathaya Kudral, Bangalore (IN); Balaji Srinivas Holur, Bangalore (IN); Sarbojit Ganguly, Bangalore (IN); Venkappa Mala, Bangalore (IN); Suneel Kumar Surimani, Bangalore (IN); Sharan Kumar Allur, Bangalore (IN)

(73) Assignee: Samsung Electronics Co., Ltd

( * ) Notice: Subject to any disclaimer, the term of this patent is extended or adjusted under 35 U.S.C. 154(b) by 1070 days.

(21) Appl. No.: 16/480,545

(22) PCT Filed: Feb. 23, 2018

(86) PCT No.: PCT/KR2018/002285
§ 371 (c)(1),
(2) Date: Jul. 24, 2019

(87) PCT Pub. No.: WO2018/155963
PCT Pub. Date: Aug. 30, 2018

(65) Prior Publication Data
US 2020/0019854 A1    Jan. 16, 2020

(30) Foreign Application Priority Data

Feb. 24, 2017  (IN) .............................. 201741006649
Feb. 21, 2018  (IN) .............................. 201741006649

(51) Int. Cl.
*G06F 9/445*    (2018.01)
*G06F 9/50*    (2006.01)

(52) U.S. Cl.
CPC .......... *G06F 9/505* (2013.01); *G06F 9/44505* (2013.01); *G06F 9/5044* (2013.01)

(58) Field of Classification Search
None
See application file for complete search history.

(56) References Cited

U.S. PATENT DOCUMENTS 6,304,824 B1 * 10/2001 Bausch .................... G06F 1/26
                                                            327/513
6,425,021 B1   7/2002 Ghodrat et al.
(Continued)

FOREIGN PATENT DOCUMENTS

| EP | 1 715 405 | 10/2006 |
| JP | 2008090546 | 4/2008 |
| KR | 1020130074952 | 7/2013 |

OTHER PUBLICATIONS

Indian Examination Report dated Oct. 28, 2020 issued in counterpart application No. 201741006649, 6 pages.
(Continued)

*Primary Examiner* — Paul Yen
(74) *Attorney, Agent, or Firm* — The Ferrell Law Firm, P.C.

(57) ABSTRACT

The present invention describes a method of accelerating execution of one or more application tasks in a computing device using machine learning (ML) based model. According to one embodiment, a neural accelerating engine present in the computing device receives a ML input task for execution on the computing device from a user. The neural accelerating engine further retrieves a trained ML model and a corresponding optimal configuration file based on the received ML input task. Also, the current performance status
(Continued)

of the computing device for executing the ML input task is obtained. Then, the neural accelerating engine dynamically schedules and dispatches parts of the ML input task to one or more processing units in the computing device for execution based on the retrieved optimal configuration file and the obtained current performance status of the computing device.

15 Claims, 6 Drawing Sheets

(56) References Cited

U.S. PATENT DOCUMENTS

| | | | |
|---|---|---|---|
| 8,015,564 B1 | 9/2011 | Beyer et al. | |
| 8,726,272 B2 | 5/2014 | Williams et al. | |
| 2014/0053165 A1* | 2/2014 | Stellwag | G06F 9/544 |
| | | | 719/312 |
| 2014/0108773 A1 | 4/2014 | Jagathessan et al. | |
| 2015/0317563 A1 | 11/2015 | Baldini Soares et al. | |
| 2015/0347849 A1* | 12/2015 | Vullioud | G06T 7/001 |
| | | | 345/633 |
| 2016/0161136 A1 | 6/2016 | Macek et al. | |
| 2016/0283286 A1 | 9/2016 | Balabhadrapatruni et al. | |

OTHER PUBLICATIONS

PCT/ISA/210 Search Report issued on PCT/KR2018/002285, pp. 3.
PCT/ISA/237 Written Opinion issued on PCT/KR2018/002285, pp. 6.

* cited by examiner

[Fig. 1b]
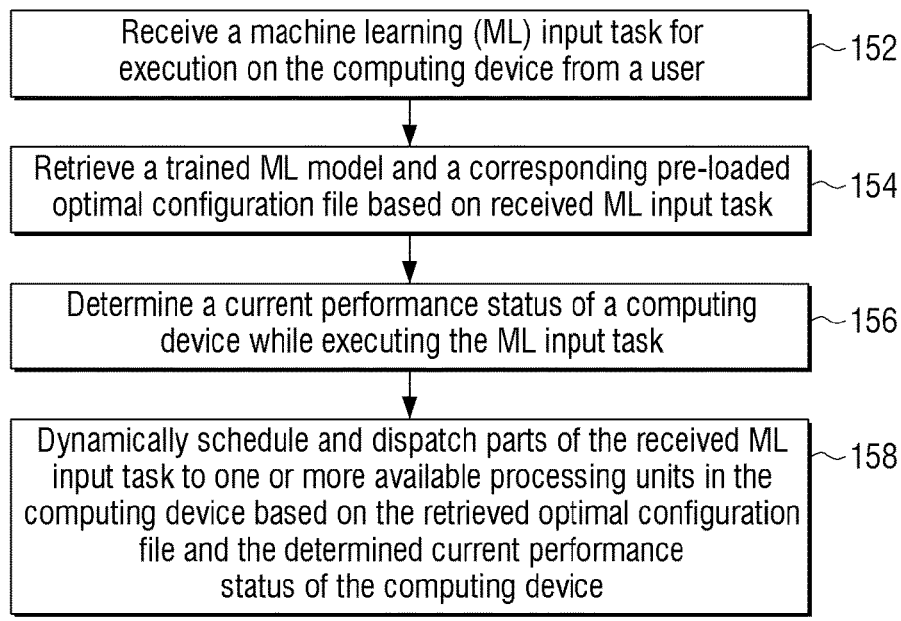
[Fig. 2a]
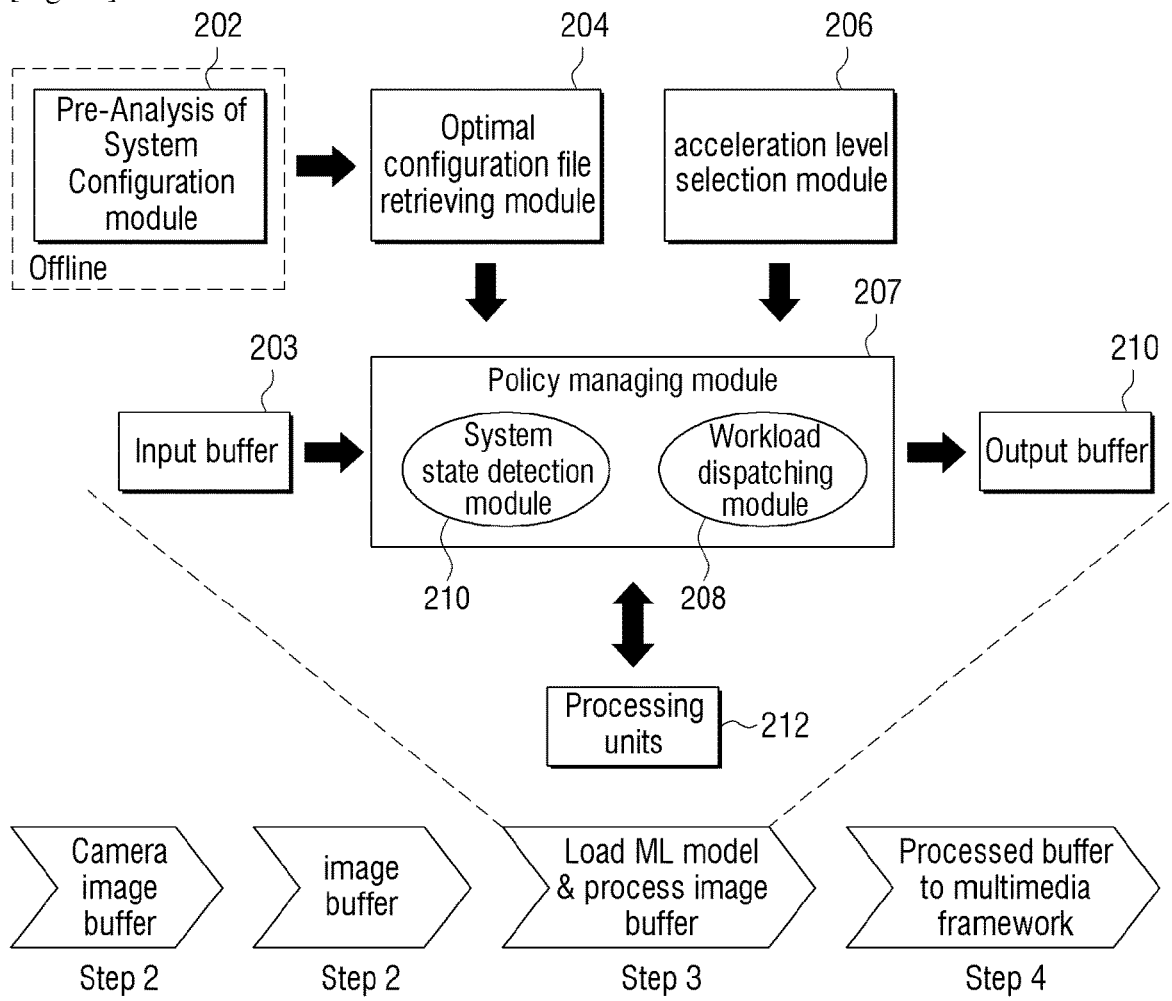

[Fig. 2b]
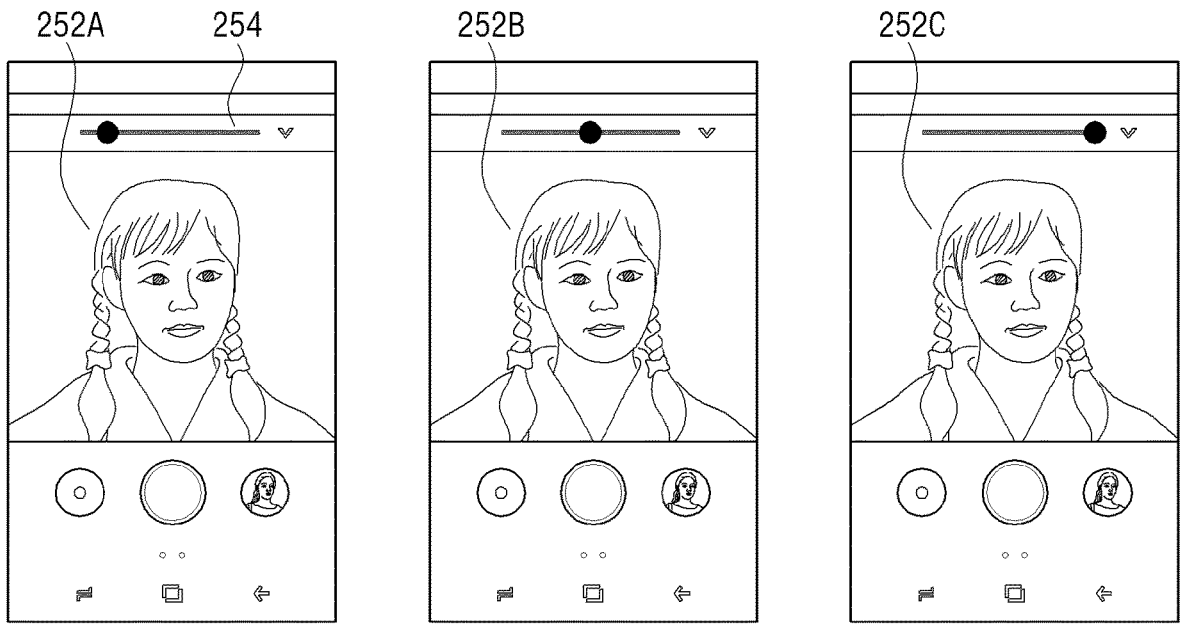
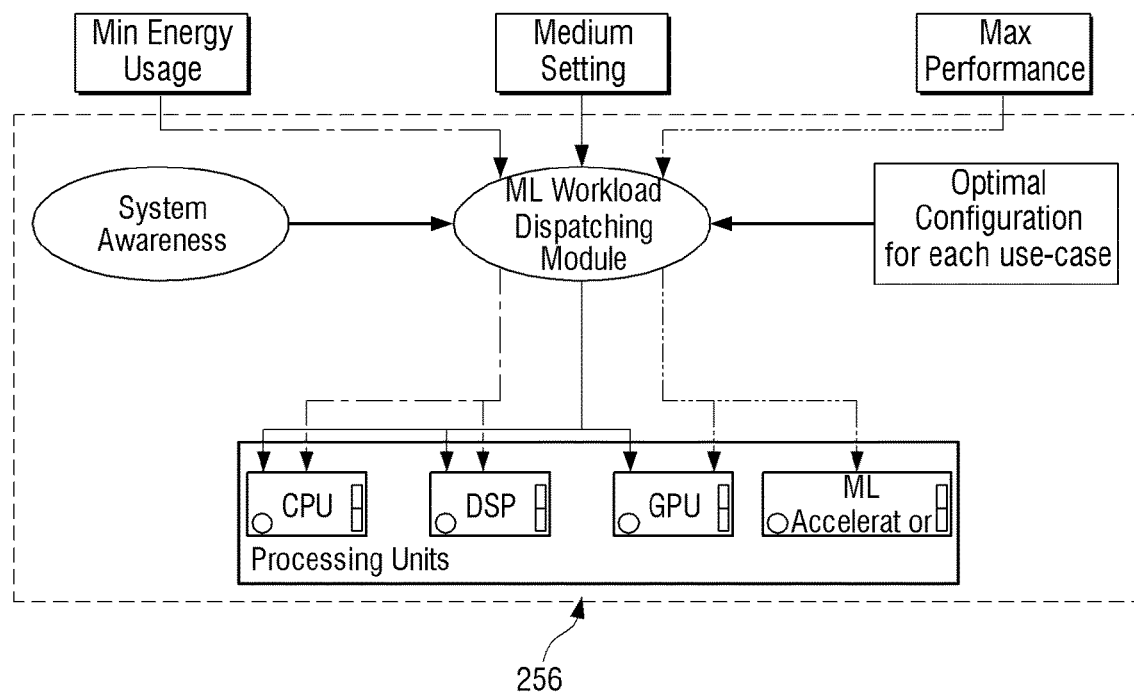

[Fig. 3]
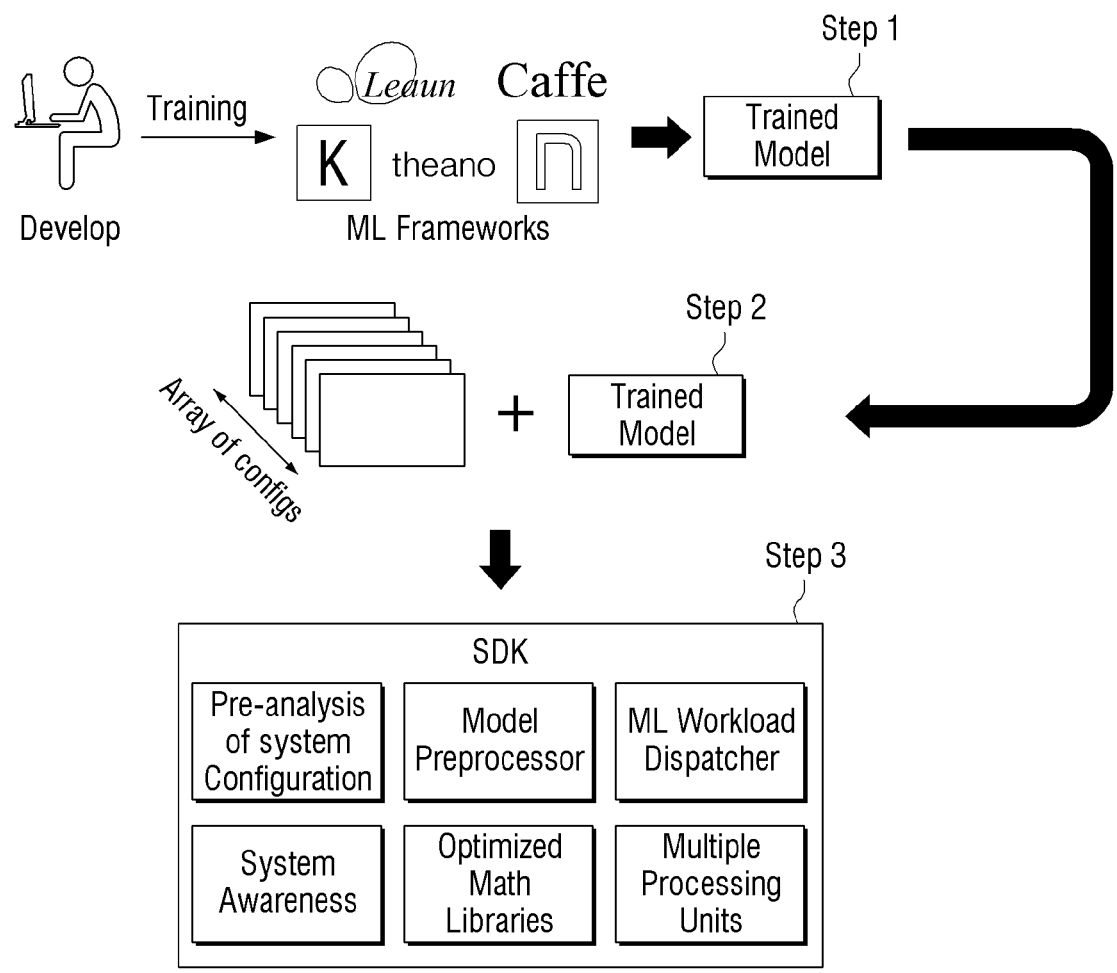

[Fig. 4]
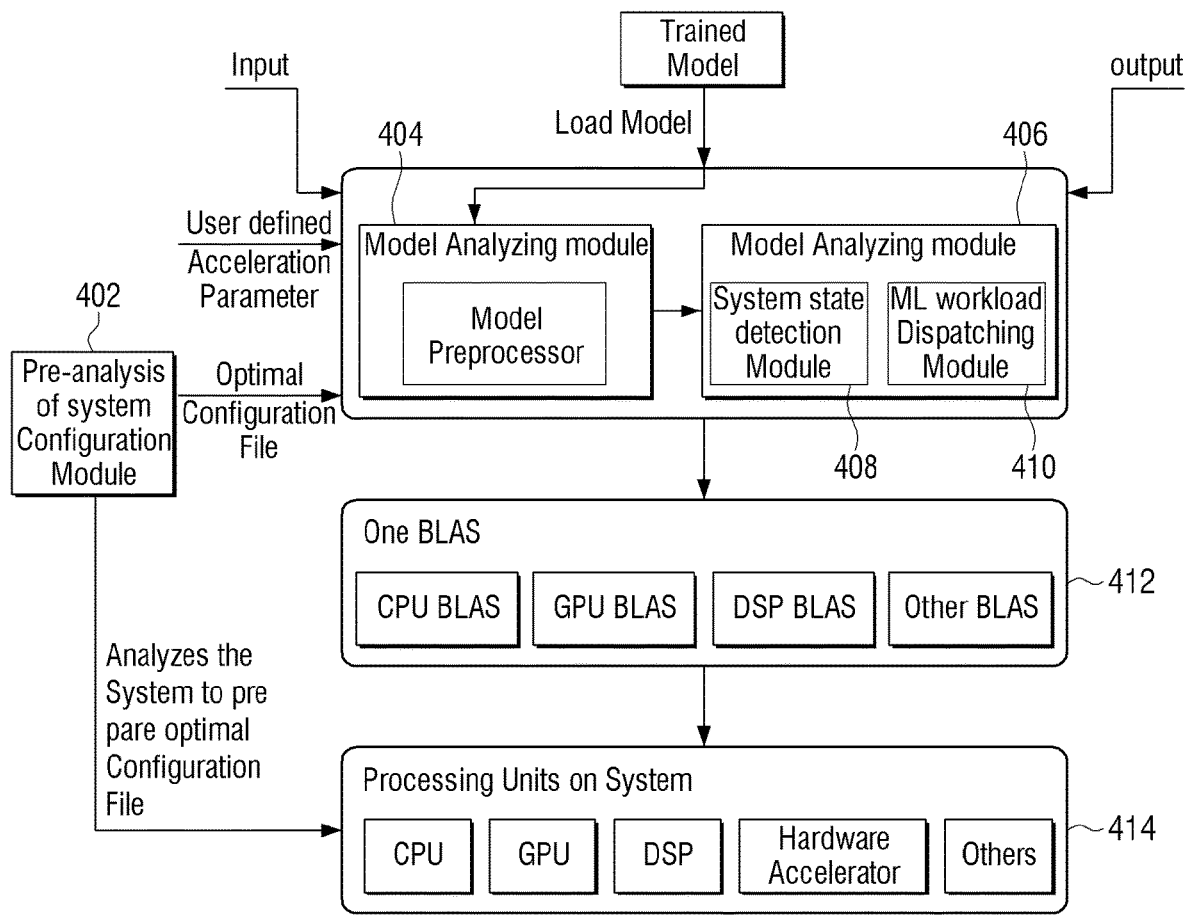

METHOD OF ACCELERATING EXECUTION OF MACHINE LEARNING BASED APPLICATION TASKS IN A COMPUTING DEVICE

PRIORITY

This application is a National Phase Entry of International Application No. PCT/KR2018/002285, which was filed on Feb. 23, 2018, and claims priority to Indian Provisional Patent Application No, 201741006649 (PS) and Indian Complete Patent Application No. 201741006649 (CS), which were filed on Feb. 24, 2017 and Feb. 21, 2018, respectively, the content of each of which is incorporated herein by reference.

TECHNICAL FIELD

The present invention generally relates to field of neural networks, and more particularly relates to a method of accelerating execution of machine learning based application tasks in a computing device.

BACKGROUND ART

Advances in Machine Learning, specifically in the field of Deep Learning, are leading to widespread success in providing accurate solutions to various problems such as object detection, speech recognition and so on. The computational needs of running inference of these trained models are huge and application developers are unable to leverage the available system hardware effectively.

Deep learning is revolutionizing the field of Machine Learning (ML), in accurately solving a wide array of problems like object detection, object segmentation, saliency detection, speech recognition, image classification and many more. Solutions to these problems have a variety of applications especially if it can be used in mobile devices.

To deploy deep neural networks (DNN) in a given use case, it is required to go through a two-stage process called training and inference. Training is much more computationally intensive than inference as it requires a number of iterations of execution and error back propagation until the DNN model achieves the required accuracy. Hence, training is generally performed on desktop PCs or GPU farm servers to reduce the time to train a network. However, some real-time use cases demand an on-device inference.

Further, the number of mathematical operations required to be executed for DNN inference is huge and developers are generally unable to match their latency requirements on low performance mobile systems. To overcome this problem, powerful cloud servers are maintained and the inference is executed for a batch of inputs. Cloud computing is not ideal because of its uninterrupted connectivity requirements and that any server failures or high load on servers will affect user experience. On-device execution is thought to be simpler for development and maintenance.

The processing units present on most mobile devices are powerful enough to achieve the performance requirements for the inference of most DNNs. For example, the PowerVR GT7600 GPU which hosts 384 ALU cores and Adreno530 which hosts 256 ALU cores, both of which are present on embedded devices. In these processing units, the performance issues faced are generally due to the lack of a properly optimized inference framework and the inefficient management of the available processing resources of the system.

Currently, some neural networks cannot be executed on all user equipment (UEs) due to latency constraints of existing frameworks. Considering the constraints, neural network application developer as of today also needs to take care of accelerating the inference, and thereby end up not utilizing the underlying hardware efficiently.

For many years, developing any machine learning system required a feature engineering process that transformed input data into features, which classifiers can use to classify the data or detect patterns. Deep learning is a type of representation-learning method with multiple levels of representation. In simpler terms, deep learning technique enables machines to automatically extract the relevant features required for detection or classification. These features are not handcrafted, but are learned as part of the training process.

As the complexity and size of neural networks increased mainly because of the emergence of deep learning techniques, performance issues became more and more prominent. This lead to numerous research being done with varied success.

According to an existing art, a method discloses compression of DNN models to reduce computation and leverages a mix of heterogeneous processors. One popular method to accelerate inference is to hand-tune the trained model to reduce the number of operations required. The obvious disadvantages of this method are the loss of accuracy and that this needs to be done manually for each model. From the industry, some companies have developed Deep Learning SDKs that enable accelerated inference, but the internal details of these frameworks are not clearly known.

Existing UEs uses graphic processor for in general purpose computation (GPGPU). Further, according to the existing art, neon engines are used for mathematical computation, and digital signal processors (DSPs) can be used for mathematical computation to reduce power consumption.

Currently, there is no framework for on device acceleration of any given neural network to achieve best system KPIs. Further, there is no framework that accelerates the inference of trained DNNs on mobile systems.

Thus, there is a need for a method that addresses the herein above-mentioned issues and problems and attempt to provide solutions.

DISCLOSURE OF INVENTION

Technical Problem

Various embodiments herein describe a method of accelerating execution of one or more application tasks in a computing device using machine learning (ML) based model.

Solution to Problem

According to one embodiment, the method includes receiving a ML input task for execution on the computing device from a user, retrieving a trained ML model and a corresponding optimal configuration file based on the received ML input task, wherein the optimal configuration file corresponding to each ML model includes a plurality of pre-defined configuration files obtained for one or more computing device functioning conditions, obtaining a current performance status of the computing device for executing the ML input task, and dynamically scheduling and dispatching parts of the ML input task to one or more processing units in the computing device for execution based on the retrieved optimal configuration file and the obtained current performance status of the computing device.

According to one embodiment, the execution of the ML input task is accelerated based on selection of at least one of energy saving level and performance level parameters by a user.

According to one embodiment, the method further comprises of controlling, level of acceleration of execution of the ML input task based on the at least one of energy saving level and computing device performance level parameters selected by the user.

According to one embodiment, the method further comprises of scheduling and dispatching the parts of the ML input task to a cloud service in addition to the one or more processing units in the computing device.

According to one embodiment, the current performance status of the computing device is obtained based on at least one of availability of processing units, load, temperature, energy usage and input data size.

According to one embodiment, the one or more ML trained models and the corresponding one or more optimal configuration files are loaded for executing the ML input task.

According to one embodiment, the method further comprises of creating a plurality of configuration files based on one or more computing device functioning scenarios, and selecting an optimal configuration file from the plurality of created configuration files.

According to one embodiment, the optimal configuration file is created during an offline mode.

Various embodiments herein further describe a computing device for accelerating execution of one or more application tasks. According to one embodiment, the computing device comprises of a storage and a processor configured to receive a ML input task for execution on the computing device from a user, retrieve a trained ML model and a corresponding optimal configuration file stored in the storage based on the received ML input task, wherein the optimal configuration file corresponding to each ML model includes a plurality of pre-defined configuration files for one or more computing device functioning scenarios, obtain a current performance status of the computing device for executing the ML input task, and dynamically schedule and dispatch parts of the ML input task to one or more processing units in the computing device for execution based on the retrieved optimal configuration file and the obtained current performance status of the computing device.

According to one embodiment, the execution of the ML input task is accelerated based on selection of at least one of energy saving level and performance level parameters by a user.

According to one embodiment, the processor controls level of acceleration of execution of the ML input task based on the at least one of energy saving level and computing device performance level parameters selected by the user.

According to one embodiment, the processor schedules and dispatches the parts of the ML input task to a cloud service in addition to the one or more processing units in the computing device.

According to one embodiment, the current performance status of the computing device is obtained based on at least one of availability of processing units, load, temperature, energy usage and input data size.

According to one embodiment, the one or more ML trained models and the corresponding one or more optimal configuration files are loaded for executing the ML input task.

According to one embodiment, the processor creates a plurality of configuration files based on one or more computing device functioning scenarios and selects an optimal configuration file from the plurality of created configuration files.

The foregoing has outlined, in general, the various aspects of the invention and is to serve as an aid to better understand the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

Advantageous Effects of Invention

Thus, the present invention allows a user to accelerate execution of an ML based input task by distributing computations among multiple processing units based on system state and optimal configuration file. The present invention can be applied in different applications including, but not limited to, selective focus, semantic searches, style transfer, keyboard for learning writing style of the user and the like.

BRIEF DESCRIPTION OF DRAWINGS

The other objects, features and advantages will occur to those skilled in the art from the following description of the preferred embodiment and the accompanying drawings in which:

FIG. 1B is a flowchart diagram illustrating an exemplary method of accelerating execution of the one or more machine learning (ML) input tasks in a computing device, according to one embodiment of the present invention.

FIG. 2A is a schematic view illustrating a use case scenario of accelerating execution of a style transfer based ML input task in a computing device, according to an embodiment of the present invention.

FIG. 2B is a schematic view illustrating an exemplary scenario of allowing a user to control acceleration levels of execution of style transfer based input task via a user interface of a computing device, according to an embodiment of the present invention.

FIG. 3 is a schematic view illustrating a use case scenario of how a program developer trains an ML model using existing ML frameworks and uses a neural accelerating engine to accelerate the ML based application tasks, according to an embodiment of the present invention.

FIG. 4 is an architecture diagram of a neural accelerating engine for accelerating execution of a ML input task, according to an embodiment of the present invention.

Figure 1A:
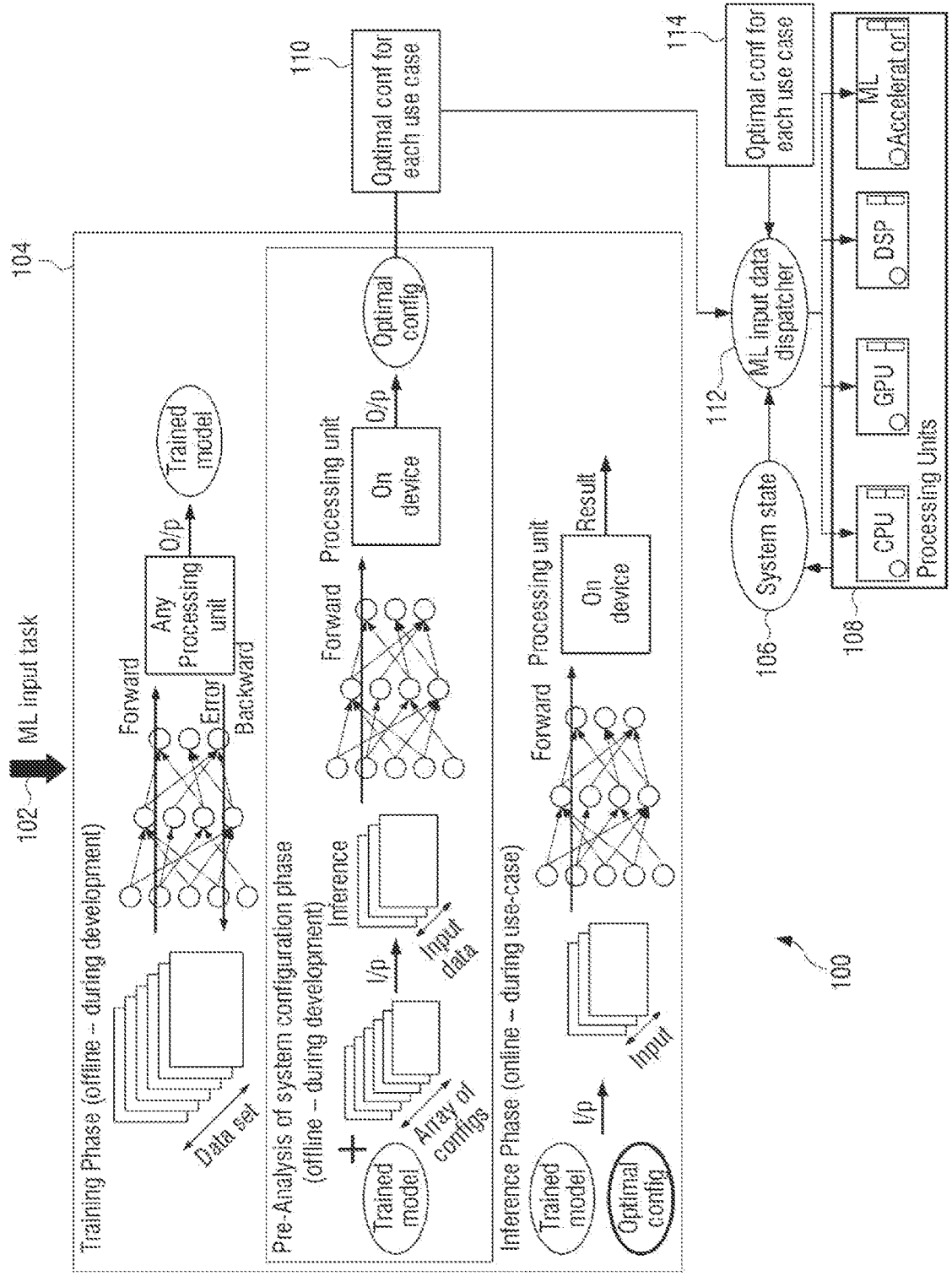
FIG. 1A is a schematic diagram illustrating a neural accelerator engine 100 present in a computing device for accelerating one or more machine learning (ML) based application tasks, according to an embodiment of the present invention.

Although specific features of the present invention are shown in some drawings and not in others, this is done for convenience only as each feature may be combined with any or all of the other features in accordance with the present invention.

BEST MODE FOR CARRYING OUT THE INVENTION

Mode for the Invention

The present invention describes a method of accelerating execution of machine learning (ML) based application tasks in a computing device. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Throughout the document, the term "system" refers to the "computing device".

The present invention describes a method for accelerating execution of one or more machine learning application tasks in a computing device. The computing device includes at least one of, but not limited to, a mobile phone, a laptop, a desktop computer and/or any personal digital assistant device. At first, a trained model is created for an input task in a training phase. Then, a plurality of configuration files is generated for different device conditions for generating plurality of configuration files. Of the plurality of configuration files, an optimal configuration file for each input task is retrieved and stored for future use. When any new ML input task is received by the computing device, the optimal configuration file is retrieved and current device performance data is fed as input to a ML workload dispatcher for sharing the ML input task with one or more processing units.

FIG. 1A is a schematic diagram illustrating a neural accelerator engine 100 present in a computing device for accelerating one or more machine learning (ML) based application tasks, according to an embodiment of the present invention. According to FIG. 1A, the neural accelerator engine 100 comprises of a training phase, a pre-analysis system configuration phase and an inference phase, wherein during the training phase and the pre-analysis system configuration phase, the computing device is operated in an offline mode and the during the inference phase, the computing device is operated in an online mode. During the training phase, one or more data sets are provided to a neural network, trained using at least one processing unit in any computing device, to create one or more trained ML models. During the pre-analysis system configuration phase, the one or more trained machine learning models are operated for one or more computing device configurations (e.g. one or more device functioning conditions) to obtain an optimal configuration file. In some embodiments, different optimal configuration files are obtained for different ML use cases. When any new ML based application task is received in real time, the respective ML trained model and the corresponding optimal configuration file are retrieved in the inference phase. The input ML based application task includes at least one of (a) a selective focus task, (b) a style transfer task, (c) an image classification task, (d) a semantic search task, (e) a neural keyboard enabling task or (f) a drowsiness detection task. During the inference phase, the computing device is operated in the online mode.

The neural accelerator engine further includes a system state detecting module 106, an acceleration level selection module 114 and a ML workload dispatching module 112. The system state detecting module 106 determines current performance status of the computing device, wherein the current performance status is determined based on device parameters such as, but not limited to, availability of one or more processing units, load, temperature, energy usage, and workload details like input data size. The information about device parameters and the optimal configuration file is provided to a ML work load dispatching module 112. In turn, the ML workload dispatching module 112 allocates the input task to the respective processing units 108 based on a current performance status determined and the acceleration level selected by the user. The acceleration level is selected based on selection parameters.

In some embodiments, the user is allowed to control the acceleration level of execution of the ML input task. This is achieved by providing a user interface option on the computing device for the user to control the acceleration level. The user is also allowed to optionally select selection parameters in order to control level of the acceleration the ML input task. The selection parameters include energy selection parameters (e.g. medium, low, high) and performance selection parameters (e.g. medium, low, high). In an embodiment, the parts of the machine learning task are scheduled and dispatched to a cloud server in addition to the one or more processing units in the computing device via one or more respective basic linear algebra sub-programs (BLAS) to achieve best level Key Performance Indicators (KPIs).

Meanwhile, the computing device may be implemented as a storage and a processor.

The storage may store trained ML models and optimal configuration files corresponding to the trained ML models, respectively.

The processor may control the overall operations of the computing device. For example, the operation of the neural accelerator engine 100 may be performed by the processor or the computing device. Specifically, the processor obtains current performance status of the computing device, and allocates the input task to the respective processing units 108 included in the processor based on a current performance status determined and the acceleration level selected by the user. In addition, the processor may perform the operation of the training phase and the pre-analysis system configuration phase.

FIG. 1B is a flowchart diagram illustrating an exemplary method of accelerating execution of the one or more machine learning (ML) input tasks in a computing device, according to one embodiment of the present invention. At step 152, an input ML based application task is received for execution on the computing device from a user. At step 154, a trained ML model and a corresponding optimal configuration is retrieved based on type of the ML task received. It is to be noted that for different types of ML tasks different types of optimal configuration files can be obtained. At step 156, a current performance status of the computing device is determined while executing the machine learning based application task. At step 158, parts of the machine learning based application task is scheduled and dispatched dynamically to one or more available processing units in the computing device based on the current performance status and an acceleration level optionally received from the user.

FIG. 2A is a schematic view illustrating a use case scenario of accelerating execution of a style transfer based ML input task in a computing device, according to an embodiment of the present invention. According to this embodiment, the input task-'Style transfer' allows a user to recompose images in the style of other images or artwork using machine learning. This may be used to create interesting computer vision applications. The step by step procedure in accelerating execution of the style transfer based ML input task is explained herein as follows. At step 1, a camera receives an input from the user for performing style transfer based ML input task on a captured image buffer. At step 2, an input to capture an image is received by the camera present in the computing device. The camera, then, enables the lens and captures an image buffer at step 2. A neural accelerating engine present in the computing device upon receiving the input, loads respective trained ML model for style transfer based ML input task and process the image buffer. The same is performed at step 3. The execution of step 3 comprises the involvement of one or more modules present in the neural accelerating engine and shown in an exploded form in FIG. 2A for better understanding of the present invention.

As shown in FIG. 2A, the neural accelerating engine comprises of a pre-analysis system configuration module 202, an optimal configuration retrieval module 204, an acceleration level selection module 206 and a workload dispatching module 208. In one exemplary operation, an input buffer 203 for the ML input task is received from the camera image buffer of the computing device to perform style transfer based ML input task. In response, the optimal configuration retrieval module 204 retrieves an optimal configuration file for the style transfer based input task and provide it to the policy managing module 207. It is to be noted that the optimal configuration file is obtained from the pre-analysis system configuration module 202 through the process as described in FIG. 1A. The policy manager module 208 includes a system state detection module (210) and machine learning (ML) workload dispatching module 208, wherein the system state detection module 210 provides information on the current performance status of the computing device and the ML workload dispatching module 208 dispatches and schedules the parts of the machine learning task to the one or more processing units that are available in the computing device based on the current performance status of the computing device and the optimal configuration file retrieved for the style transfer based input task. In some embodiments, the user is allowed to control acceleration of execution of style transfer task. This is achieved by providing a slider on a user interface of the camera application for selecting/controlling the acceleration level of execution. Upon executing the style transfer based input task on the captured image buffer, the processing unit transfers the processed image buffer to a multimedia framework via the output buffer 210. This is performed at step 4. The same is illustrated in FIG. 2A.

Meanwhile, the operation of FIG. 2A may be performed by the processor of the computing device. For example, the processor retrieves an optimal configuration file for the style transfer based input task, obtains provides information on the current performance status of the computing device and dispatches and schedules the parts of the machine learning task to the one or more processing units included in the processor based on the current performance status of the computing device and the optimal configuration file retrieved for the style transfer based input task.

FIG. 2B is a schematic view illustrating an exemplary scenario of allowing a user to control acceleration levels of execution of style transfer based input task via a user interface of a computing device, according to an embodiment of the present invention. At first, consider that the user selects minimum level of acceleration using a slider 254 displayed on the computing device. Accordingly, the computing device that functions with minimum acceleration level (e.g. minimum energy usage) by dispatching the parts of the style transfer based input task to most energy efficient processing units 256 such as DSP, CPU that uses less number of threads. The same is shown in screen 252A.

Similarly, Screen 252B depicts the computing device that functions with medium acceleration level (e.g. medium settings) to obtain best possible performance with optimum energy usage. A user may move the slider 254 to half of its level to obtain medium level performance. According to the level of slider movement, the ML workload dispatching module dispatches the parts of the image capturing task to the available processing units and spawns the threads in an optimal fashion. Screen 252C depicts the computing device that functions with maximum acceleration level (e.g. maximum performance) by dispatching the parts of the style transfer based input task to the one or more processing units 256 that are adapted for maximum performance (e.g. GPU). As shown in FIG. 2B, the user has moved the slider 254 to its full length for obtaining maximum performance. Accordingly, the ML workload dispatching module dispatches the input task to the respective processing units 256.

FIG. 3 is a schematic view illustrating a use case scenario of how a program developer trains an ML model using existing ML frameworks and uses a neural accelerating engine to accelerate the ML based application tasks, according to an embodiment of the present invention. According to this embodiment, consider that a program developer wants to accelerate level of execution of ML based application tasks. For this, the program developer initially uses their existing ML frameworks such as, Tensor Flow, Caffe and the like to create a trained ML model by following the procedure described in FIG. 1A. This is performed at step 1. Then, the program developer feed an array of configurations obtained for different device functioning scenarios and the trained ML model into neural accelerating engine (SDK) to accelerate the on-device ML inference of their trained ML models. This is performed at step 2 and 3 respectively. The same is illustrated in FIG. 3.

FIG. 4 is an architecture diagram of a neural accelerating engine for accelerating execution of a ML input task, according to an embodiment of the present invention. As shown in FIG. 4, the architecture of a neural accelerating engine comprises of four main modules namely, a Pre-analysis of System Configuration module 402, a policy managing module 404, a model analyzing module 406, and one BLAS 408.

In an exemplary operation, a trained ML model is fed to a model analyzing module 404 such as model preprocessor, wherein the ML model is trained using a training phase as described in FIG. 1A. A pre-analysis system configuration module 402 then analyzes different working scenarios for the input task and prepares a plurality of configuration files for each input task scenario. The pre-analysis system configuration module 402 further retrieves and provides an optimal configuration file for the particular ML task to the model analyzing module 404. Then, this optimal configuration file is fed to the model analyzing module 404. Further, an acceleration level selected by the user is fed into policy managing module.

The model analyzing module 404 pre-processes dynamic neural network model for inference and decides initial dispatch policy according to device capabilities. The model analyzing module 404 further communicates the preprocessed model and the optimal configuration file to a policy managing module 406. The policy managing module 406 further includes a system state detection module 408 and a ML workload dispatching module 410. The system state detection module 408 dynamically determines current status of the computing device by tracking one or more parameters associated with the processing unit including, but not limited to, online status, bandwidth, load, temperature and the like of the processing units. All the tracked parameters of the processing units are passed as input to ML workload dispatcher. The ML workload dispatching module 410 then schedules and dispatches parts of the ML task to one or more processing units 414 in the computing device via one or more respective basic linear algebra sub-programs (BLAS) 412. The one or more BLAS or Mathematical libraries supports different processing units and allows access of entire processing units via this unified interface. The one or more BLAS 412 supports accessing of the one or more processing units 414 to accelerate the execution of the ML task. The same is illustrated in FIG. 4.

Figure 5:
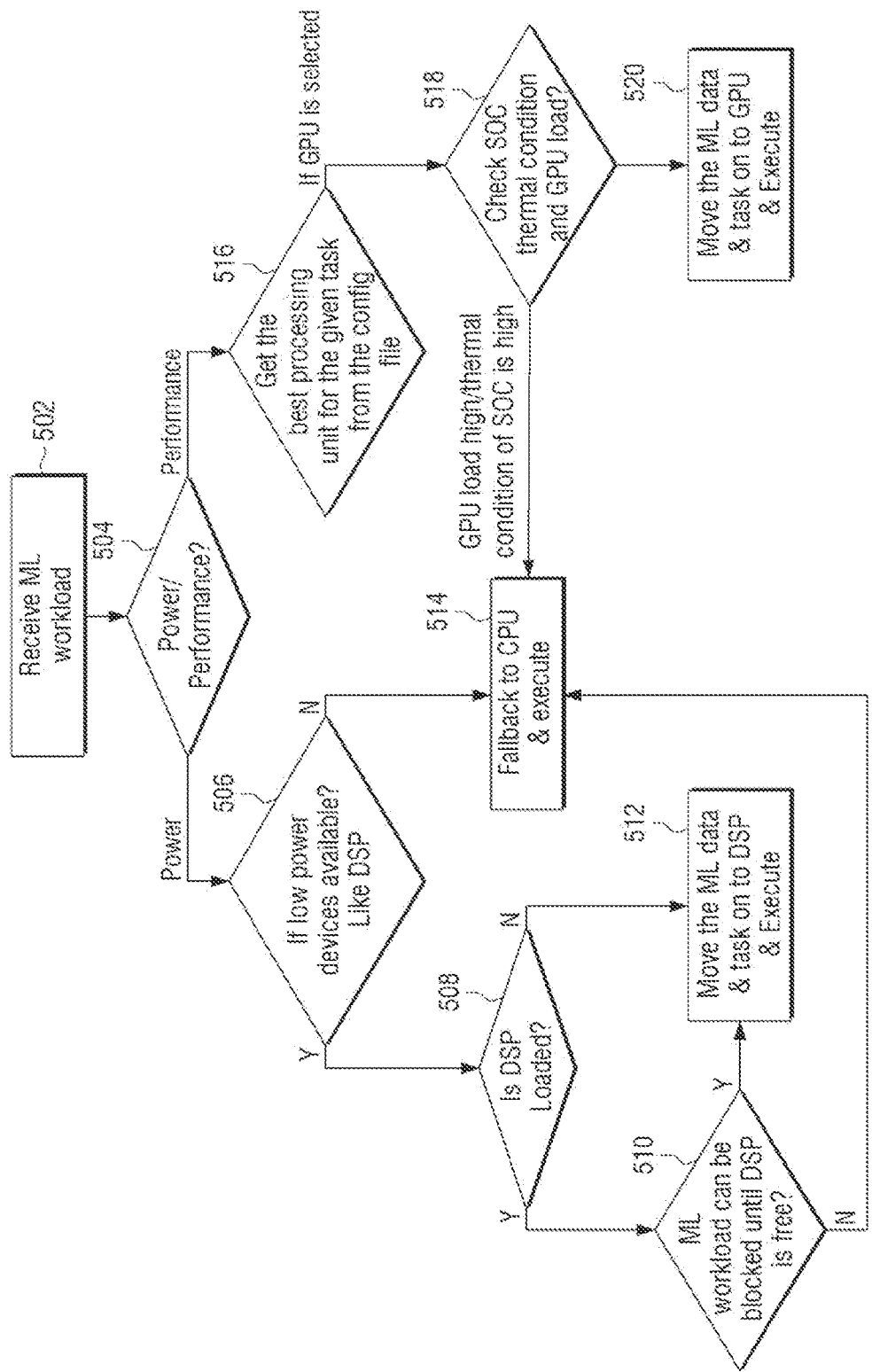
FIG. 5 is a flow diagram illustrating an exemplary method of dispatching parts of the machine learning (ML) based application task to one or more processing units for accelerating execution of ML based application task, according to an embodiment of the present invention.

FIG. 5 is a flow diagram illustrating an exemplary method of dispatching parts of the machine learning (ML) based application task to one or more processing units for accelerating execution of ML based application task, according to an embodiment of the present invention. In this embodiment, consider that the ML based application task is received by a ML workload dispatching module. The ML workload dispatching module receives the workload, at step 502. At step 504, it is checked whether the ML workload is executed for low power or high performance. If low power execution is selected, at step 506, the ML workload dispatching module checks for availability of low power processing units such as DSP. If the DSP is available to perform the parts of the machine learning task or share the workload, at step 508, the ML workload dispatching unit then checks whether DSP is loaded. If the DSP is loaded with other input tasks, at step 510, the ML workload dispatching module checks whether the ML workload can be blocked until the DSP is available. If yes, the ML workload dispatching module waits for DSP to become available and then the ML data and task are moved onto the DSP and the ML workload is executed. This is performed at step 512.

If the ML workload cannot be blocked until the DSP is free, then at step 514, the ML workload is given back to the CPU for execution. Similarly, at step 508, if it is determined that the DSP is not loaded in the computing device, then the ML workload is executed on the DSP as shown in Step 514.

At step 504, if it is determined that the ML workload is to be executed for maximum performance, at step 516, the ML workload dispatching module obtains best processing unit for the given task from the configuration file. If GPU is selected as best processing unit, at step 518, thermal condition of the computing device/SOC is checked and further checked the load conditions of the GPU. If the thermal condition of the SOC is high or the load of GPU is high, then the ML workload is given back to CPU for execution. This is performed at step 514. On the other hand, if the GPU is not loaded, then at step 520, ML data and task is moved to the GPU for execution. The same is illustrated in FIG. 5.

Thus, the present invention allows a user to accelerate execution of an ML based input task by distributing computations among multiple processing units based on system state and optimal configuration file. The present invention can be applied in different applications including, but not limited to, selective focus, semantic searches, style transfer, keyboard for learning writing style of the user and the like.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The invention claimed is:

1. A method of accelerating execution of one or more application tasks in a computing device using machine learning (ML) based model, the method comprising:
 receiving an ML input task for execution on the computing device from a user;
 retrieving a trained ML model and a corresponding optimal configuration file based on the received ML input task, wherein the optimal configuration file corresponding to each ML model includes a plurality of pre-defined configuration files obtained for one or more computing device functioning conditions;

obtaining a current performance status of the computing device for executing the ML input task; and dynamically scheduling and dispatching parts of the ML input task to one or more processing units in the computing device for execution based on the obtained current performance status of the computing device, wherein the dynamically scheduling and dispatching comprises:

determining whether the ML input task is executed for low power or high performance, if it is determined that the ML input task is to be executed for low power execution, checking availability of the low power processing unit, if the low power processing unit is available to perform the ML input task, checking whether the low power processing unit is loaded, if the low power processing unit is loaded with other input tasks, checking whether the ML input task can be blocked until the other input tasks are performed by the low power processing unit, and if the ML input task can be blocked, moving the parts of the ML input task to the low power processing unit for execution after the other input tasks are performed by the low power processing unit, if the ML input task cannot be blocked or if the low power processing unit is not available to perform the ML input task, moving the parts of the ML input task to a first processing unit for execution, if it is determined that the ML input task is to be executed for high performance execution, obtaining a second processing unit for the ML input task from the retrieved optimal configuration file, and checking the thermal condition of the computing device and load condition of the second processing unit, if the thermal condition of the computing device is high or the load of the second processing unit is high, moving the parts of the ML input task to the first processing unit for execution, wherein the first processing unit has lower performance than the second processing unit, and if the thermal condition of the computing device is low and the load of the second processing unit is low, moving the parts of the ML input task to the second processing unit for execution.

2. The method as claimed in claim 1, wherein the execution of the ML input task is accelerated based on selection of at least one of energy saving level and performance level parameters by a user.

3. The method as claimed in claim 2, further comprising:
controlling, the level of acceleration of execution of the ML input task based on the at least one of energy saving level and computing device performance level parameters selected by the user.

4. The method as claimed in claim 1, further comprising:
scheduling and dispatching the parts of the ML input task to a cloud service in addition to the one or more processing units in the computing device.

5. The method as claimed in claim 1, wherein the current performance status of the computing device is obtained based on at least one of availability of processing units, load, temperature, energy usage and input data size.

6. The method as claimed in claim 1, wherein the one or more ML trained models and the corresponding one or more optimal configuration files are loaded for executing the ML input task.

7. The method as claimed in claim 1, further comprising:
creating a plurality of configuration files based on one or more computing device functioning scenarios; and
selecting an optimal configuration file from the plurality of created configuration files.

8. The method as claimed in claim 1, wherein the optimal configuration file is created during an offline mode.

9. A computing device for accelerating execution of one or more application tasks, comprising:
a storage; and
a processor configured to:
receive a ML input task for execution on the computing device from a user;
retrieve a trained ML model and a corresponding optimal configuration file stored in the storage based on the received ML input task, wherein the optimal configuration file corresponding to each ML model includes a plurality of pre-defined configuration files for one or more computing device functioning scenarios;
obtain a current performance status of the computing device for executing the ML input task; and
dynamically schedule and dispatch parts of the ML input task to one or more processing units in the computing device for execution based on the obtained current performance status of the computing device,
wherein the processor is further configured to:
determine whether the ML input task is executed for low power or high performance,
if it is determined that the ML input task is to be executed for low power execution, check availability of the low power processing unit,
if the low power processing unit is available to perform the ML input task, check whether the low power processing unit is loaded,
if the low power processing unit is loaded with other input tasks, check whether the ML input task can be blocked until the other input tasks are performed by the low power processing unit, and if the ML input task can be blocked, move the parts of the ML input task to the low power processing unit for execution after the other input tasks are performed by low power processing unit,
if the ML input task cannot be blocked or if the low power processing unit is not available to perform the ML input task, move the parts of the ML input task to a first processing unit for execution,
if it is determined that the ML input task is to be executed for high performance execution, obtain a second processing unit for the ML input task from the retrieved optimal configuration file, and check the thermal condition of the computing device and load condition of the second processing unit,
if the thermal condition of the computing device is high or the load of the second processing unit is high, move the parts of the ML input task to the first processing unit for execution, wherein the first processing unit has lower performance than the second processing unit, and
if the thermal condition of the computing device is low and the load of the second processing unit is low, move the parts of the ML input task to the second processing unit for execution.

10. The computing device as claimed in claim 9, wherein the execution of the ML input task is accelerated based on selection of at least one of energy saving level and performance level parameters by a user.

11. The computing device as claimed in claim 10, wherein the processor controls the level of acceleration of execution of the ML input task based on the at least one of energy saving level and computing device performance level parameters selected by the user.

12. The computing device as claimed in claim 9, wherein the processor schedules and dispatches the parts of the ML input task to a cloud service in addition to the one or more processing units in the computing device.

13. The computing device as claimed in claim 9, wherein the current performance status of the computing device is obtained based on at least one of availability of processing units, load, temperature, energy usage and input data size.

14. The computing device as claimed in claim 9, wherein the one or more ML trained models and the corresponding one or more optimal configuration files are loaded for executing the ML input task.

15. The computing device as claimed in claim 9, wherein the processor creates a plurality of configuration files based on one or more computing device functioning scenarios and selects an optimal configuration file from the plurality of created configuration files.

\* \* \* \* \*